Sept. 21, 1926.
J. STETSON
1,600,646
CHILD'S VEHICLE
Filed April 20, 1926    2 Sheets-Sheet 1
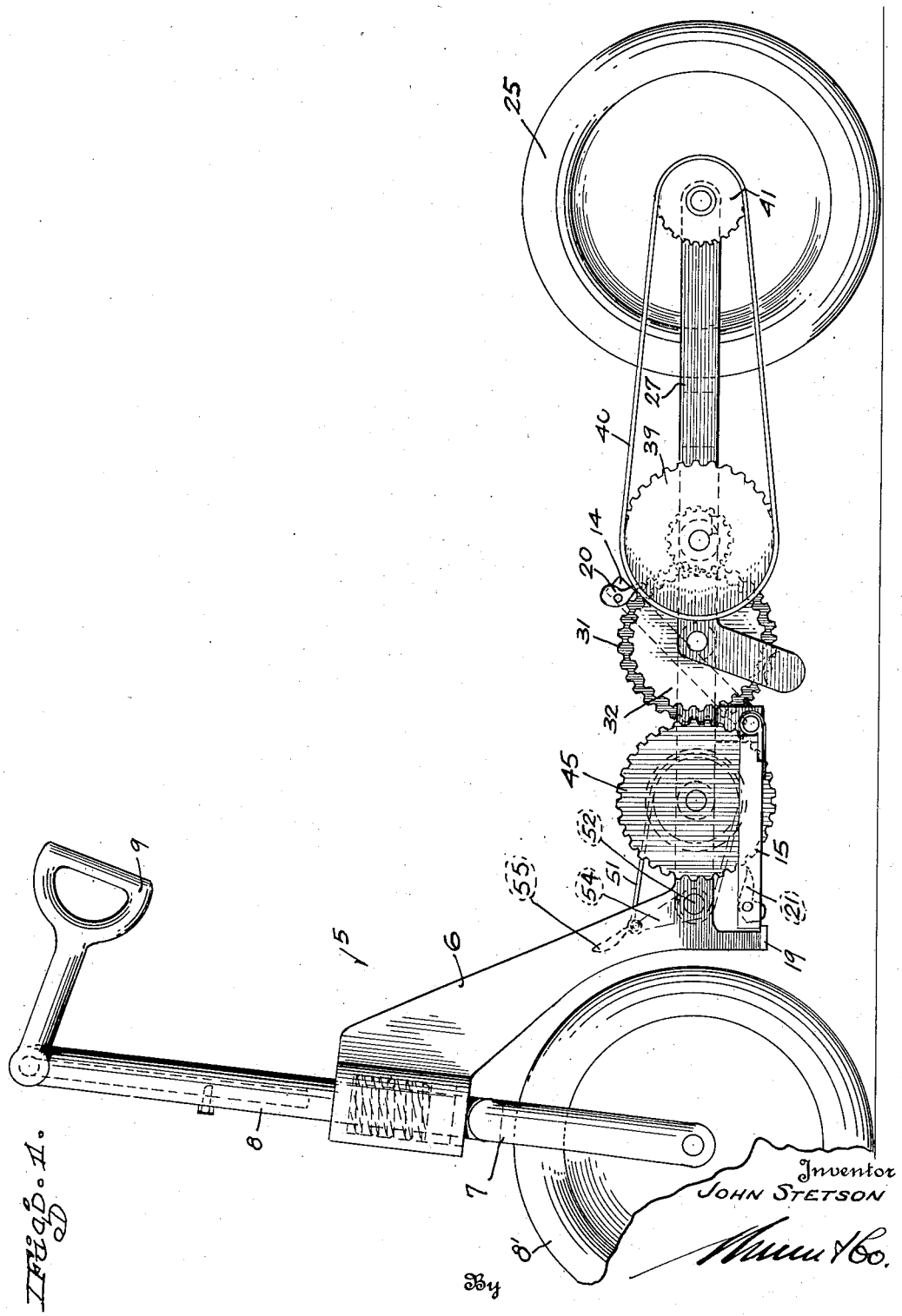
Inventor
JOHN STETSON
By
Attorneys.

Sept. 21, 1926.
J. STETSON
1,600,646
CHILD'S VEHICLE
Filed April 20, 1926    2 Sheets-Sheet 2
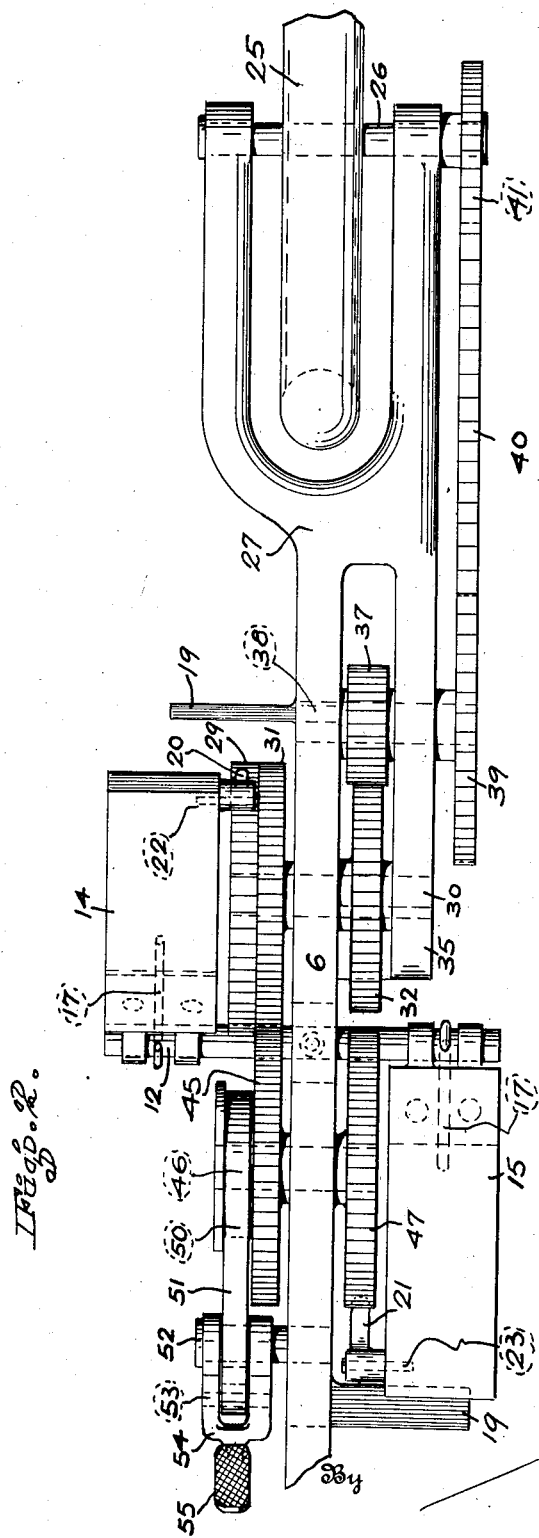
Inventor
JOHN STETSON
Attorneys Patented Sept. 21, 1926.

1,600,646

UNITED STATES PATENT OFFICE.

JOHN STETSON, OF SAN FRANCISCO, CALIFORNIA.

CHILD'S VEHICLE.

Application filed April 20, 1926. Serial No. 103,329.

This invention relates to children's vehicles and has for one of its objects the provision of a novel vehicle adapted to be propelled by the feet of a child.

With the foregoing object in view, together with such other objects and advantages as may subsequently appear, this invention resides in the construction and arrangement of parts hereinafter described and claimed, and illustrated in the accompanying drawings, in which:—

Figure 1 is a side elevation of one embodiment of my invention, the front wheel being fragmentary.

Figure 2 is a plan view of the major portion of Figure 1.

Referring to the drawings for more detailed description thereof, the device comprises a frame 5. The frame 5 comprises a main frame 6 and a frame 7, the lower end of the latter being forked. The front wheel 8' is mounted in the forked portion, the frame 7 being continuous with a post 8 to which is pivotally secured a steering handle 9.

Non-rotatably secured to the frame 6 and on the underside thereof, is a shaft 12, to the end portions of which are pivotally secured pedals 14 and 15. Yielding means are provided in association with each pedal for holding the same in raised position, the raised position of the pedal 14 being shown in Figures 1 and 2.

The mentioned means comprise springs 17, the ends of which are secured to the shaft 12, while the other end portions of these springs underlie their respective pedals. The springs, however, yield to foot pressure. When the pedals are fully pressed down they are horizontal as indicated by the pedal 15 in Figure 1. Stops 19 secured to the frame 6, are provided to limit the downward movement of each of the pedals.

Dogs 20 and 21 are respectively pivoted on pins 22 and 23, these pins being respectively held to the pedals 14 and 15. The mentioned dogs are each attached to actuate a train of gears when their respective pedals are pressed downwardly by the rider of the vehicle. From the gear trains, which have parts in common, motion may be transmitted to the rear wheel 25 which is mounted on an axle 26 journaled in a forked portion 27 of the rear portion of the frame. The wheel 25 rotates between the forked portion 27 of the frame. The dog 20, when the pedal 14 is pressed downwardly, engages the gear wheel 29 and turns it. The gear 29 is mounted on a shaft 30. Gear wheels 31 and 32 are also mounted on the shaft 39 which is journaled in the frame 6, the gears 31 and 32 are on opposite sides of the main portion of the frame 6, while the gear 32 is between the main portion of the frame 6 and a branch 35 thereof. The turning of the shaft 30 turns the gears 31 and 32, while the turning of the latter turns a gear 37 meshed with it.

The gear 37 is mounted on a shaft 38 journaled in the frame and extending laterly from the frame. The shaft 38 carries a gear wheel 39 on which rides a chain 40 which engages a gear 41 mounted on the shaft 26.

It will thus be seen that the turning of the gear 37 is effective to turn the wheel 25. The gear 31 meshes with a gear 45 mounted on a shaft 46 which is journaled in the frame 6. Turning the gear 31 is therefore effective to turn the shaft 46 and to turn also a gear 47 which is mounted on the shaft 46. The gear 47 is on the opposite side of the main portion of the frame 6, from the gear 45, and is adapted to be engaged by the dog 21 associated with the pedal 15.

When the pedal 15 is pressed downwardly, the dog 21 turns the gear 47, thereby turning the gears 45 and 31. The gears 31, 32, 37, 39, the chain 40 and the gear 41 are common to both gear trains. It will therefore be readily seen that the movement of the pedal 15 is effective, through the mentioned apparatus, to turn the rear wheel 25. It will be understood of course that the pedals 14 and 15 are alternately pressed downwardly by the foot of the rider.

Mounted on the shaft 46 is a brake drum 50 on which rides a belt 51 which is secured at one end to a stationary shaft 52 fixed in the frame 6, and at the other end to a pin 53 journaled in a clevis member 54, to which is secured a pedal 55. The clevis member is pivoted on the shaft 52.

On pressing down the pedal 55 the belt is tightened and stops the drum and the shaft 46 from rotating. There is thus provided means for braking both sets of gear trains.

While I have described one embodiment of my invention, modifications thereof may be readily devised without departing from the spirit of my invention, and it is to be understood that such modifications come within the scope of the appended claims.

I claim:—

1. A child's vehicle comprising a frame, front and rear wheels for said frame, a first shaft disposed transversely to said frame and non-rotatably secured thereto, pedals pivoted each at an end thereof to said first shaft, one at each end, said pedals extending in opposite directions from said first shaft, yielding means associated with each pedal for holding it in raised position and trains of gears, one for each pedal, each pedal having means operable thereby to actuate one of said gear trains.

2. A child's vehicle comprising a frame, front and rear wheels for said frame, a first shaft disposed transversely to said frame and non-rotatably secured thereto, pedals pivoted to said first shaft, one at each end, said pedals extending in opposite directions from said first shaft, yielding means associated with each pedal for holding it in raised position and trains of gears, one for each pedal, each pedal having means operable thereby to actuate one of said gear trains, and a stop for each pedal for limiting the downward movements of the pedals.

3. The combination described in claim 1 in which the means operable by each pedal to actuate one of said gear trains comprises a dog pivoted to each pedal and adapted to engage a gear wheel in one of said gear trains.

4. A child's vehicle comprising a frame, front and rear wheels for said frame, a first shaft disposed transversely to said frame and non-rotatably secured thereto, pedals pivoted to said first shafts, one at each end, said pedals extending in opposite directions from said first shaft, resilient means associated with each pedal for holding it in raised position and trains of gears, one for each pedal, each pedal having means operable thereby to actuate one of said gear trains, and means for transmitting motion from each of said gear trains to one of said wheels.

5. A child's vehicle comprising a frame, front and rear wheels for said frame, a first shaft disposed transversely to said frame and non-rotatably secured thereto, pedals pivoted to said first shaft, one at each end, said pedals extending in opposite directions from said first shaft, yielding means associated with each pedal for holding it in raised position and trains of gears, one for each pedal, each pedal having means operable thereby to actuate one of said gear trains, and means for transmitting motion from each of said gear trains to one of said wheels, and a stop for each pedal for limiting the downward movements of the pedals.

JOHN STETSON